(12) United States Patent
Chisu

(10) Patent No.: US 12,167,282 B2
(45) Date of Patent: Dec. 10, 2024

(54) COMMUNICATION DEVICE WITH PREDICTED SERVICE FAILURE TRIGGERED REGISTRATION FALLBACK FOR REDUCED COMMUNICATION SERVICE SETUP

(71) Applicant: MOTOROLA MOBILITY LLC, Wilmington, DE (US)

(72) Inventor: Daniel C Chisu, Franklin Park, IL (US)

(73) Assignee: Motorola Mobility LLC, Chicago, IL (US)

( * ) Notice: Subject to any disclaimer, the term of this patent is extended or adjusted under 35 U.S.C. 154(b) by 157 days.

(21) Appl. No.: 17/586,274

(22) Filed: Jan. 27, 2022

(65) Prior Publication Data

US 2023/0239744 A1 Jul. 27, 2023

(51) Int. Cl.
*H04W 36/00* (2009.01)
(52) U.S. Cl.
CPC .............. *H04W 36/0022* (2013.01)
(58) Field of Classification Search
CPC . H04W 36/14; H04W 36/0022; H04W 76/30; H04W 76/34; H04W 48/18
USPC ................... 455/436–449; 370/331
See application file for complete search history.

(56) References Cited

U.S. PATENT DOCUMENTS

| 2014/0355565 | A1* | 12/2014 | Hayes | H04W 36/0085 370/331 |
| 2015/0250007 | A1* | 9/2015 | Ramkull | H04W 76/10 370/329 |
| 2018/0007588 | A1* | 1/2018 | Lin | H04W 76/18 |
| 2022/0107852 | A1* | 4/2022 | Kulkarni | G06F 9/542 |

* cited by examiner

Primary Examiner — Michael Y Mapa
(74) Attorney, Agent, or Firm — Isidore PLLC

(57) ABSTRACT

A communication device, method and computer program product reduce time to connect a communication session. The communication device registers for cellular communication service using a first radio access technology (RAT) or sub-RAT with a first node. The communication device determines whether a connection for a selected communication service is predicted to be available from the first node. The communication device determines whether a request for the selected communication service is predicted to occur. In response to determining that the connection for the selected communication service is unavailable from the first node and the request for the selected communication service is predicted to occur, the communication device identifies a second node that supports communication using a second RAT/sub-RAT. The communication devices triggers registration fallback from the first node to the second node. In response to receiving the request, the communication device connects to the second node for the selected communication service.

18 Claims, 8 Drawing Sheets

COMMUNICATION DEVICE WITH PREDICTED SERVICE FAILURE TRIGGERED REGISTRATION FALLBACK FOR REDUCED COMMUNICATION SERVICE SETUP

BACKGROUND

1. Technical Field

The present disclosure relates generally to a communication device that supports cellular communication services, and more particularly to a communication device that supports connecting to cellular communication services via multiple different radio access technologies.

2. Description of the Related Art

Initial deployment of fifth generation (5G) new radio (NR) cellular base nodes often included integration with co-located fourth generation (4G) long term evolved (LTE) base nodes for non-standalone (NSA) dual connectivity at an LTE-NR radio access node (RAN). Communication services can be shifted between the two radio access technologies (RATs), such as 5G NR and 4G LTE, with some overhead, based on factors such as specific types of communications available at each base node and the differing communication characteristics of each RAT.

When registered for 5G NR communication services from a gNB in a standalone (SA) implementation, a communication device may request a particular communication service such as a new radio voice call (VoNR) that is not available from the gNB. Alternatively, or in addition, the gNB may fail frequently in connecting a communication session for VoNR. A servicing network responds by redirecting the communication device to a RAN that uses 4G LTE for call establishment. In particular, the servicing network performs a complex sequence of tasks referred to as evolved packet service (EPS) fallback, moving active Internet protocol Multimedia Subsystem (IMS) connection and radio layers from 5G NR to 4G LTE. EPS fallback involves significant overhead in complex signaling between the communication device and a number of different network elements. The signaling complexity increases setup time by seconds in a best case situation. In a challenging radio frequency (RF) environment, a realistic increase of setup time is about 50% longer. These increases in setup time in cellular base nodes are very noticeable to a user of the communication device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
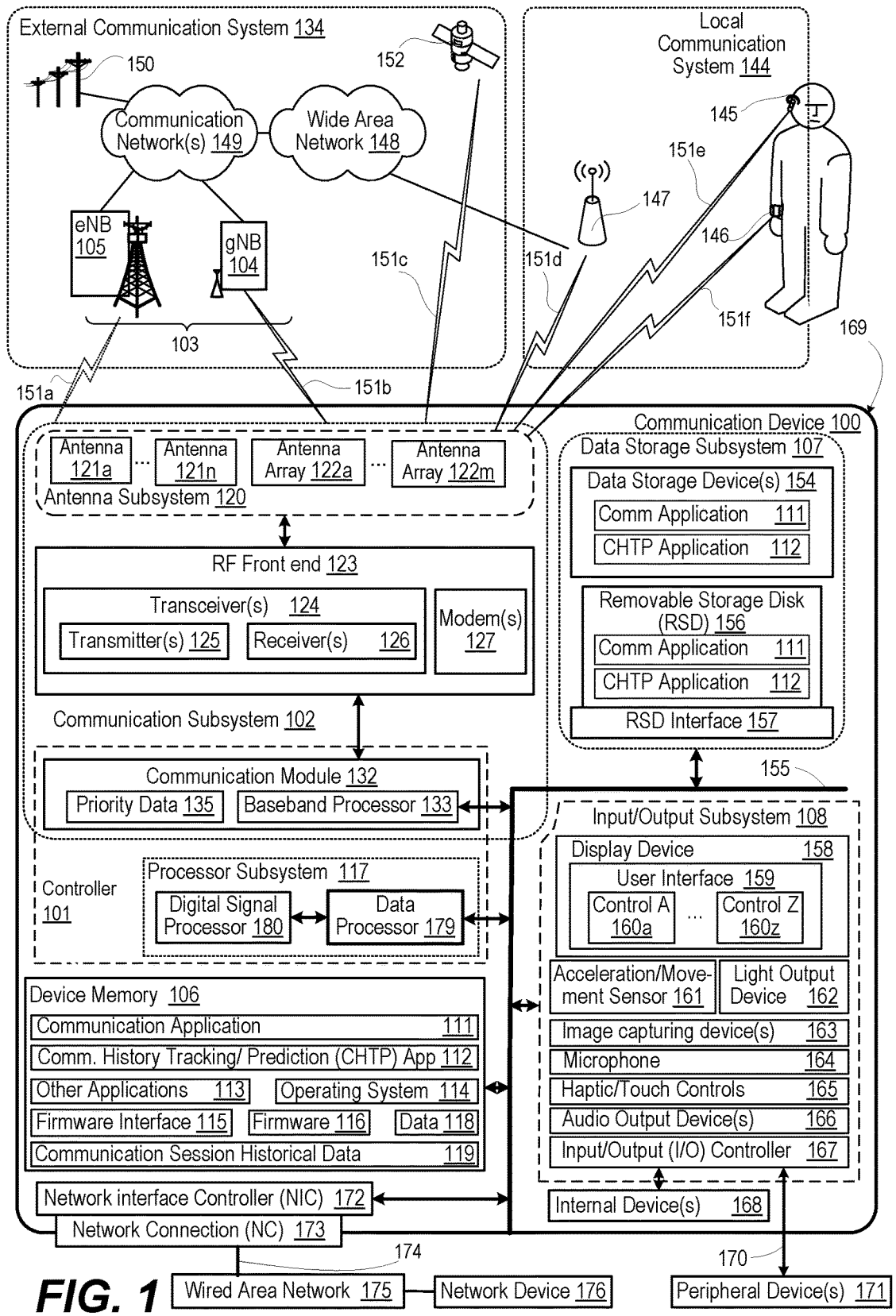
FIG. 1 depicts a functional block diagram of a communication environment including a communication device that supports cellular communication calls on at least two different radio access technologies (RATs), and within which the features of the present disclosure are advantageously implemented, according to one or more embodiments.

According to a first aspect of the present disclosure, a communication device, a method and a computer program product reduce setup time for connecting a communication session by initiating fallback to a different cellular radio access technology (RAT) or a sub-RAT based on a prediction or expectation of failure to complete the connection via a first RAT. In particular, the communication device initiates the fallback in response to determining both: (i) that a request for the communication session is predicted to occur; and (ii) that an attempt to setup the communication session on a serving cellular base node is predicted to fail. The communication device includes a communication subsystem that is communicatively connectable to two or more base nodes using either of a first RAT/sub-RAT and a second RAT/sub-RAT. The communication device includes a memory that stores a communication application. A controller of the communication device is communicatively coupled to the communication subsystem. The controller registers the communication device for cellular communication service using the first RAT/sub-RAT with a first node of the two or more base nodes. The controller determines whether a connection for a selected communication service is predicted to be available from the first node. The controller determines whether a mobile originated request for the selected communication service is predicted to occur. In response to determining that (i) the connection for the communication service is unavailable from the first node and (ii) the mobile originated request for the selected communication service is predicted to occur, the controller identifies a second node of the two or more base nodes that supports the selected communication service using the second RAT/sub-RAT. The controller triggers registration fallback from the first node to the second node. In response to receiving a request from the communication application to connect the selected communication service, the controller automatically connects the selected communication service via the second node. The controller thus avoids the longer set-up time required when the connection request is required to be first processed by the first node and to fail, before being transferred to the second node.

In one or more embodiments, the amount of certainty in a prediction required to trigger registration fallback may be optimized for considerations of one or more factors in addition to setup time for a selected communication service. Mitigating a burden to the network in registration fallback may shift the required amount of certainty to be higher. In an example, prediction of a failure by the first node to connect the selected service may be required to be 100% certain, such as if the first node has broadcast to the communication device that the selected communication service is not supported. In another example, prediction of a failure by the first node to connect the selected service may be required to be nearly 100% certain, such as at least 90% certain, based on historically failing 9 or 10 times in the last 10 times to connect the selected service. In an additional example, prediction of a failure by the first node to connect the selected service may be required to be probable, such as more than 50% certain. The stored historical data indicates that the connection fails frequently more often than not. In a further example, prediction of a failure by the first node to connect the selected service may be required to be reasonably possible to occur, such as more than 25% certain. The historical data indicates that the connection occasionally fails. In addition, the amount of certainty of a prediction that the user will request the selected communication service can have similar settings.

Cellular radio access technology has progressed through a number of radio access technologies. A first generation (1G) used analog cellular technology. Beginning with a second generation (2G), digital cellular technology is used such as with global system for mobile communications (GSM) code division multiple access (CDMA). Two competing third generation (3G) RATS are Universal Mobile Telecommunications Service (UMTS) and 3G wideband code division multiple access (WCDMA). Fourth generation (4G) RAT is evolved UTMS radio access (E-UTRA), referred to a Long Term Evolved (LTE). A fifth generation (5G) RAT, referred to as fifth generation new radio (5G NR), has been deployed to at least augment capabilities of 4G LTE with a yet higher capability of data transfer. In some instances, 4G LTE and 5G NR are deployed together to operate in non-standalone (NSA) dual connectivity. In other instances, 5G NR is deployed as a standalone (SA) service and not coupled to 4G LTE service. In an example, 5G NR base nodes ("gNB") tend to provide greater data throughput rates for reduced data latency but have reduced coverage areas. In particular, gNB support millimeter wave (mmWave) communication bands that are essentially line of sight transmissions whereas legacy sub-6 GHz communication bands used by 4G LTE base nodes ("eNB") can more readily support a larger coverage area. Development continues for what will be six generation (6G) RATs and more advanced RATs. In an example of the application of the features of the present disclosure, a first RAT is a later generation RAT such as 5G NR and a second RAT is an earlier generation RAT such as 4G LTE. Aspects of the present disclosure also apply to situations in which the communication device is registered to a base node on a legacy RAT, such as an evolved base node (eNB) that uses 4G LTE. In some instances, the eNB may be unable to provide the communication service that is available from a later generation RAT, such as a new radio base node (gNB).

Aspects of the present disclosure also applies to two "sub-RATs" that utilize different transmission bands within the same general RAT. In an example, 5G NR communication services may include a sub-6 GHz ("low frequency") sub-RAT as well as a mmWave ("high frequency") sub-RAT. A communication device may by default request and register for the mmWave sub-RAT for higher data throughput or other reasons and then need registration fallback to the sub-6 GHz sub-RAT to connect for a selected communication service not available on the mmWave sub-RAT. For simplicity, the description generally refers to different RATS with examples of 4G LTE and 5G; However, it is appreciated that these examples also extend to the sub-RAT domain where a single primary RAT (e.g., 5G) supports multiple different sub-RATs.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device in an operating environment within which the features of the present disclosure are advantageously implemented. In particular, communication device 100, managed by controller 101, is an example of an electronic device that enables an enhanced user experience by reducing an amount of time to connect a communication service requested by communication device 100. Communication device 100 includes communication subsystem 102 that is communicatively connectable to cellular base nodes 103 using either of a first radio access technology (RAT) and a second RAT. In an example, cellular base nodes 103 include: (i) gNB 104 that communicates with communication subsystem 102 using RAT 5G NR; and (ii) eNB 105 that communicates with communication subsystem 102 using RAT 4G LTE. Controller 101 initiates a registration change between gNB 104 and eNB 105 to shorten connection setup time when expecting a currently registered one of gNB 104 and eNB 105 will fail to provide a selected communication service, such as a voice call, when a request by communication device 100 for the communication service is predicted to happen. In addition to a voice call, the communication session that is requested may include: a video service; a virtual reality (VR) service; extended reality (XR) service; augmented reality (AR) service; an Internet protocol multimedia subsystem (IMS) service; and a strict quality of service (QoS) cellular service, et al.

Communication device 100 can be one of a host of different types of devices, including but not limited to, a mobile cellular phone, satellite phone, or smart-phone, a laptop, a net-book, an ultra-book, a networked smartwatch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In one or more embodiments, communication device 100 includes controller 101 and communication subsystem 102, device memory 106, data storage subsystem 107, and input/output (I/O) subsystem 108 that are each managed by controller 101. Device memory 106 includes program code for applications, such as communication application 111, communication history tracking/prediction (CHTP) application 112, and other application(s) 113. Device memory 106 further includes operating system (OS) 114, firmware interface 115, such as basic input/output system (BIOS) or Uniform Extensible Firmware Interface (UEFI), and firmware 116.

Controller 101 includes processor subsystem 117, which executes program code to provide operating functionality of communication device 100 to reduce setup time to connect a communication service by initiating fallback to a different cellular. The software and/or firmware modules have varying functionality when their corresponding program code is executed by processor subsystem 117 or secondary processing devices within communication device 100. Processor subsystem 117 of controller 101 can execute program code of communication application 111, CHTP application 112, and other application(s) 113 to configure communication device 100 to perform specific functions. Device memory 106 can include data 118 used by the applications. CHTP application 112 monitors communication application 111 to determine when/if a request for a communication service is predicted, and CHTP application 112 responsively refers to communication session historical data 119 to determine when an attempt to setup the requested communication service is predicted to fail.

Communication subsystem 102 includes antenna subsystem 120, which includes first antennas 121a-121n and second antennas 122a-122m that support various RF bands for wireless and cellular services. With wireless frequency spectrum seemingly ever expanding, additional antennas (121a-121n, 122a-122m) are incorporated to support newer RATs and multi band operation. Dual low band (2L) or quad low band (4L) multiple input multiple output (MIMO) operation dictates multiple antennas communicate on multiple bands simultaneously. In one or more embodiments, first antennas 121a-121n support lower frequency bands such as ultra-high band (UHB). Second antennas 122a-122m are array modules (ARMs) that support MIMO communication in higher frequency bands, such as millimeter Wave (mmWave).

Communication subsystem 102 includes RF frontend 123 having transceiver(s) 124 that includes transmitter(s) 125 and receiver(s) 126. RF frontend 123 further includes modem(s) 127. Communication subsystem 102 also includes communication module 132 having baseband processor 133. Baseband processor 133 communicates with controller 101 and RF frontend 123. In one or more embodiments, baseband processor 133 performs a primary or support function as part of controller 101. Communication subsystem 102 communicates with external communication system 134. Baseband processor 133 operates in baseband frequency range to encode data for transmission and decode received data, according to a communication protocol. Modem(s) 127 modulate baseband encoded data from communication module 132 onto a carrier signal to provide a transmit signal that is amplified by transmitter(s) 125. Modem(s) 127 demodulates received signal(s) from external communication system 134 detected by antenna subsystem 120. The received signal is amplified and filtered by receiver(s) 126, which demodulate received encoded data from a received carrier signal. Baseband processor 133 manages periodic acquisition scans by RF frontend 123 of broadcasts by cellular base nodes 103, updating priority data 135. Priority data 135 includes identification of each cellular base nodes 103, carrier subscription requirements, signal strength and quality, etc. Baseband processor 133 references priority data 135 in prioritizing cellular base nodes 103 when registering for selected communication service(s) at a current location of communication device 100.

Controller 101 may determine that a selected cellular base node 103 will fail to provide a selected communication service, at least in part based on information in priority data 135. In an example, selected cellular base node 103 may indicate a specific list of services that are provided, and which does not include the selected communication service. In an additional example, the current signal strength and signal quality at the current location may indicate a challenging RF environment, such as the presence of interference, a large number of other communication devices competing for communication services, or a marginal coverage area of selected cellular base node 103, etc.

In other applications, local communication system 144 can include localized or personal devices such as wireless headset 145 and smart watch 146. Local communication systems 144 can further include access nodes 147 for wireless communication. Communication devices 100 can be provided communication services by wide area network(s) 148 that are part of external communication system 134 and linked to access nodes 147. Wide area network(s) 148 may also provide data services to communication network(s) 149 that provide communication service to communication device 100 via cellular base nodes 103. Communication network(s) 149 may be communicatively connected to plain old telephone system (POTS) 150.

Communication subsystem 102 communicates with eNB 105 via uplink/downlink channels 151a. Communication subsystem 102 communicates with gNB 151b via uplink/downlink channels 151b. Communication subsystem 102 receives satellite broadcast signals 151c from GPS satellites 152. Communication subsystem 102 communicates with access node 147 via transmit/receive signals 151d. Communication subsystem 102 communicates with wireless headset 145 via transmit/receive signals 151e. Communication subsystem 102 communicates with smart watch 146 via transmit/receive signals 151f.

In one or more embodiments, controller 101, via communication subsystem 102, performs multiple types of cellular OTA or wireless communication with external communication system 134. Communication subsystem 102 can communicate via Bluetooth connection with one or more personal access network (PAN) devices, such as wireless headset 145 and smart watch 146. Communication via Bluetooth connection includes both transmission and reception via a Bluetooth transceiver device. In one or more embodiments, communication subsystem 102 communicates with one or more locally networked devices via a wireless local area network (WLAN) link provided by access node 147. In one or more embodiments, access node 147 supports communication using one or more IEEE 802.11 WLAN protocols. Access node 147 is connected to wide area network(s) 148, such as the Internet. In one or more embodiments, communication subsystem 102 communicates with GPS satellites 152 to obtain geospatial location information.

Data storage subsystem 107 of communication device 100 includes data storage device(s) 154. Controller 101 is communicatively connected, via system interlink 155, to data storage device(s) 154. Data storage subsystem 107 provides applications, program code, and stored data on nonvolatile storage that is accessible by controller 101. For example, data storage subsystem 107 can provide a selection of applications and computer data such as communication application 111 and CHTP application 112. These applications can be loaded into device memory 106 for execution by controller 101. In one or more embodiments, data storage device(s) 154 can include hard disk drives (HDDs), optical disk drives, and/or solid-state drives (SSDs), etc. Data storage subsystem 107 of communication device 100 can include removable storage device(s) (RSD(s)) 156, which is received in RSD interface 157. Controller 101 is communicatively connected to RSD 156, via system interlink 155 and RSD interface 157. In one or more embodiments, RSD 156 is a non-transitory computer program product or computer readable storage device. Controller 101 can access RSD 156 or data storage device(s) 154 to provision communication device 100 with program code, such as code for communication application 111 and CHTP application 112.

I/O subsystem 108 includes user interface components such as display device 158 that presents user interface 159 that presents controls 160a-160z for receiving user inputs to request a communication service. I/O subsystem 108 may include acceleration/movement sensor 161, light output device 162, image capturing device(s) 163, microphone 164, touch/haptic controls 165, and audio output device(s) 166. I/O subsystem 108 also includes I/O controller 167. I/O controller 167 provides communication and power signals to functional components described herein as part of device memory 106, communication subsystem 102, data storage subsystem 107, or I/O subsystem 108. I/O controller 167 connects to internal devices 168, which are internal to housing 169, and via electrical cable 170 to tethered peripheral devices 171, which are external to housing 169 of communication device 100. Internal devices 168 include computing, storage, communication, or sensing components depicted within housing 169. I/O controller 167 supports the necessary configuration of connectors, electrical power, communication protocols, and data buffering to act as an interface between internal devices 168 and peripheral devices 171 tethered by electrical cable 170 and other components of communication device 100 that use a different configuration for inputs and outputs.

In one or more embodiments, I/O subsystem 108 includes network interface controller (NIC or "network interface") 172 with a network connection (NC) 173. Network cable 174 connects NC 173 to wired area network 175. NIC 172 can be referred to as a "network interface" that can support one or more network communication protocols. Wired area network 175 can be a local area network (LAN), a campus area network (CAN), a metropolitan area network (MAN), or a wide area network (WAN). For example, NC 173 can be an Ethernet connection. Network device 176 is communicatively coupled to wired area network 175.

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 117, which includes one or more central processing units (CPUs), depicted as data processor 179. Processor subsystem 117 can include one or more digital signal processors 180 that are integrated with data processor 179. Processor subsystem 117 can include other processors that are communicatively coupled to data processor 179, such as baseband processor 133 of communication module 132. In one or embodiments that are not depicted, controller 101 can further include distributed processing and control components that are external to housing 169 or grouped with other components, such as I/O subsystem 108. Data processor 179 is communicatively coupled, via system interlink 155, to device memory 106. In one or more embodiments, controller 101 of communication device 100 is communicatively coupled via system interlink 155 to communication subsystem 102, data storage subsystem 107, and I/O subsystem 108.

System interlink 155 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 155 are illustrated in FIG. 1, it is to be understood that more, fewer, or different interconnections may be present in other embodiments.

According to aspects of the present disclosure, communication device 100 includes communication subsystem 102 that is communicatively connectable to two or more base nodes 103 using either of first RAT or a second RAT. Communication device 100 includes device memory 106 that stores communication application 111. Communication device 100 has controller 101 that is communicatively coupled to communication subsystem 102 and device memory 106. Controller 101 registers communication device 100 for cellular communication service using the first RAT with a first node (gNB 104) of the two or more base nodes 103. Controller 101 determines whether a connection for a selected communication service is predicted to be available from the first node (gNB 104). Controller 101 determines whether a mobile originated request for the selected communication service is predicted to occur. In response to determining that (i) the connection for the selected communication service is predicted to not be available from the first node (gNB 104) and (ii) the mobile originated request for the selected communication service is predicted to occur, controller 101 identifies a second node (eNB 105) of the two or more base nodes 103 that supports communication using the second RAT. Controller 101 triggers registration fallback from the first node (gNB 104) to the second node (eNB 105). In response to receiving a request from communication application 111 to connect the selected communication service, controller 101 connects the selected communication service via the second node (eNB 105).

In one or more embodiments, to determine whether the connection for the selected communication service is predicted to be available from the first node (gNB 104), controller 101 identifies that the selected communication service comprises one or more of: (i) a voice call; (ii) a video service; (iii) a virtual reality (VR) service; (iv) extended reality (XR) service; (v) augmented reality (AR) service; (vi) an internet protocol multimedia subsystem (IMS) service; and (vii) a strict quality of service (QoS) cellular service. Controller 101 receives identification information broadcast by the first node (gNB 104) that indicates that cellular communication services currently supported by the first node (gNB 104) does not include the selected communication service.

In one or more embodiments, controller 101 determines whether the mobile originated request for the selected communication service is predicted to occur by determining that a request confidence level of a first prediction is greater than a request threshold confidence level. Controller 101 triggers registration fallback from the first node (gNB 104) to the second node (eNB 105) in response to determining that (i) the connection for the selected communication service is predicted to not be available from the first node (gNB 104) and (ii) the mobile originated request for the selected communication service is predicted to occur, with the request confidence level being greater than the request threshold confidence level.

In one or more embodiments, to determine whether the connection for the selected communication service is predicted to be available from the first node (gNB 104), controller 101 accesses, from device memory 106, stored communication session historical data 119 related to attempts to make a connection with the first node (gNB 104) for the selected communication service. Controller 101 compares, to a threshold ratio, a historical ratio of a first number of unsuccessful attempts to a second number of total attempts within a recent period of time. Controller 101 determines that the connection for the selected communication service is predicted to not be available from the first node (gNB 104) in response to the historical ratio exceeding the threshold ratio.

In a particular embodiment, in determining whether the connection for the selected communication service is predicted to be available from the first node (gNB 104), controller 101 identifies at least one of (i) received signal strength of a signal from the first node (gNB 104); (ii) received signal quality of the signal from the first node (gNB 104); and (iii) distance between communication device 100 and the first node (gNB 104). Controller 101 identifies a current coverage area of two or more coverage areas of the first node (gNB 104) in relation to the at least one of the received signal strength, the received signal quality, and the distance, the two or more coverage areas. The coverage areas include a marginal coverage area and a nominal coverage area that has a higher probability of a successful connection for cellular communication service than the marginal coverage area. Controller 101 filters the communication session historical data 119 stored in device memory 106 for attempts to make the selected communication service connection from locations in the current coverage area.

In another particular embodiment, controller 101, in response to identifying that one of a service failure and a network-initiated registration fallback has occurred, generates a new entry indicating an unsuccessful attempt for connection with the first node (gNB 104) for the selected communication service. In response to identifying that the attempt to make a connection with the first node (gNB 104) for the selected communication service is successful and that a subsequent communication service with a second communication device concludes normally, controller 101 generates the new entry indicating a successful attempt for a connection with the first node (gNB 104) for the selected communication service. Controller 101 stores the new entry in communication session historical data 119 with associated contextual data comprising at least one of: (i) received signal strength of a signal from the first node (gNB 104); (ii) received signal quality of the signal from the first node (gNB 104); (iii) distance between communication device 100 and the first node (gNB 104); and (iv) geospatial location of communication device 100.

In one or more embodiments, in determining whether the mobile originated request for the selected communication service is predicted to occur, controller 101 identifies user inputs in a sequence of two or more user inputs to communication application 111. The sequence is required, or is one option, to trigger the mobile-originated request for the selected communication service. Controller 101 determines a request confidence level of a prediction that the mobile originated request for the selected communication service will occur based on a number of completed user inputs in the sequence of two or more user inputs to communication application 111. Controller 101 determines that the mobile originated request for the selected communication service is predicted to occur when the request confidence level is greater than a request threshold confidence level.

In a particular embodiment, controller 101 identifies first instances in which the number of completed user inputs of the sequence of the two or more user inputs required to request the selected communication service were discontinued. Controller 101 identifies second instances in which the sequence was completed. Controller 101 weights the request confidence level for the number of completed user inputs of the sequence in relation to a ratio of the number of first instances in which the sequence was discontinued to the number of second instances in which the sequence was completed.

In another particular embodiment, in determining whether the mobile originated request for the selected communication service is predicted to occur above a request threshold confidence level, controller 101 identifies a user input mode from among more than one user input mode supported by the communication application. The user input mode is at least one of: (i) a touch keypad entry; (ii) a touch user contact entry; (iii) a voice numeric entry; (iv) a voice user contact entry; (v) a defined user gesture recognized in an image stream produced by an image capturing device; and (vi) a user movement gesture of the communication device detected by a movement sensor. Each user input mode has a respective request confidence level. Controller 101 determines the respective request confidence level that is related to the user input mode.

In one or more embodiments, communication device 100 includes an output device (158, 162, 165, 166) communicatively coupled to controller 101. The output device produces at least one of a light output, an audio output, and a vibration output. Controller 101 determines an amount of time that has elapsed since completion of a sequence of user inputs to communication application 111 required to request the connection for the selected communication service. Controller 101 determines whether the registration fallback from the first node (gNB 104) to the second node (eNB 105) has been completed. In response to determining that registration fallback has not been completed and that the amount of time exceeds a threshold time corresponding to registration fallback taking longer than an expected amount of time, controller 101 presents a notification at the output device indicating that connection for the selected communication service is in progress.

Figure 2:
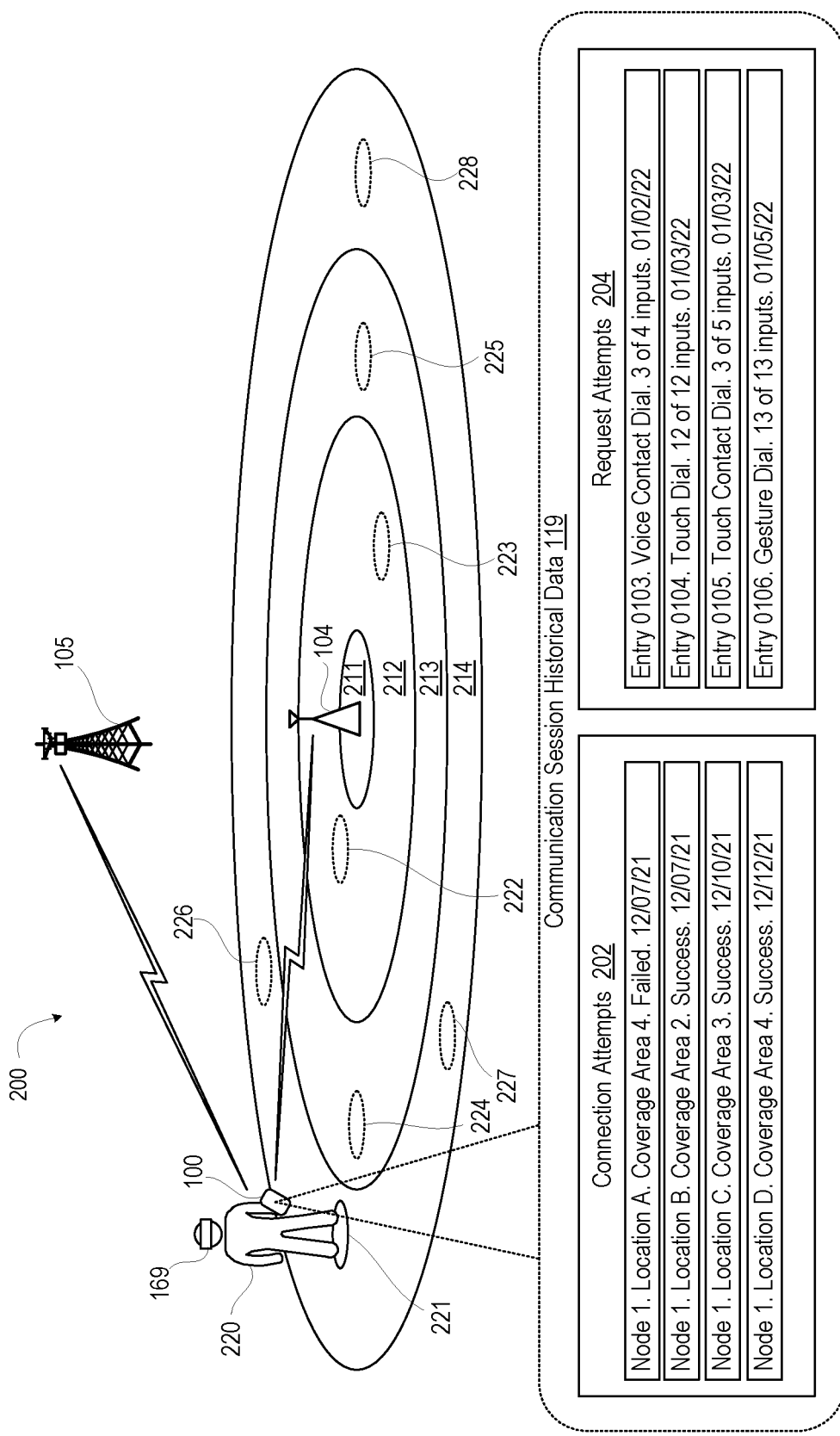
FIG. 2 depicts a communication environment in which the communication device updates communication session historical data to track partial and completed attempts by a user to request a selected communication service and attempts by selected cellular base nodes to connect the selected communication service for the communication device using a selected RAT, according to one or more embodiments.

FIG. 2 depicts communication environment 200 in which communication device 100 updates communication session historical data 119 to track connection attempts data 202 and request sequence attempts data 204. Connection attempts data 202 tracks successful and unsuccessful connection attempts and includes selected cellular base nodes (e.g., gNB 104) using a selected RAT to connect the selected communication service for communication device 100. Request sequence attempts data 204 includes data about partial and completed attempts by a user to request a selected communication service at communication device 100 by entering a sequence of user inputs required to trigger the request. Communication device 100 uses communication session historical data 119 for future predictions of a need for registration fallback to reduce setup time for a selected communication service. For clarity, communication environment 200 includes first node, depicted as gNB 104, that has four rings of coverage areas 211-214 for communication services using a first RAT such as 5G NR. Coverage area 211 is closest to and underlies gNB 104. Coverage area 212 surrounds and is adjacent to coverage area 211. Coverage area 213 surrounds and is adjacent to coverage area 212. Coverage area 214 surrounds and is adjacent to coverage area 213. Communication device 100 is also within coverage range to a second node that supports a second RAT, depicted as eNB 105 that uses 4G LTE. User 220 interacts with communication device 100 at current location 221 in coverage area 214. Communication session historical data 119 includes entries for connection attempts data 202 at locations 222-228. Locations 222 and 223 are in coverage area 212. Locations 224 and 225 are in coverage area 213. Locations 226, 227, and 228 are in coverage area 214. In calculating a prediction of a successful connection, communication device 100 may filter entries for only those locations in the same coverage area 214 of the same cellular network node (gNB 104). In example, connection attempts data 202 include entries: (i) Node 1. Location A. Coverage Area 4. Failed. 12/07/21; (ii) Node 1. Location B. Coverage Area 2. Success. 12/07/21; (iii) Node 1. Location C. Coverage Area 3. Success. 12/10/21; and (iv) Node 1. Location D. Coverage Area 4. Success. 12/12/21.

Communication device 100 updates request sequence attempts data 204 for each mode of requesting a selected communication service that requires more than one user input in a sequence. User 220 may enter a user input directly to communication device 100 or to peripheral device 171. In an example, user 220 may provide an entry utilizing one or more user input modes of: (i) a touch keypad entry; (ii) a touch user contact entry; (iii) a voice numeric entry (e.g., "Dial one two four eight" spoken by user 220); (iv) a voice user contact entry; (v) a defined user gesture recognized in an image stream produced by image capturing device(s) 163 (FIG. 1); and (vi) a user movement gesture detected by acceleration/movement sensor 161 (FIG. 1). The list of modes of user inputs are examples and not intended to be all inclusive. In an example, request sequence attempts data 204 includes the following entries: (i) Entry 0103. Voice Contact Dial. 3 of 4 inputs. 01/02/22; (ii) Entry 0104. Touch Dial. 12 of 12 inputs. 01/03/22; (iii) Entry 0105. Touch Contact Dial. 3 of 5 inputs. 01/03/22; and (iv) Entry 0106. Gesture Dial. 13 of 13 inputs. 01/05/22. As an example, a voice contact dial may include a sequence of four inputs to: (i) open a communication application; (ii) select a contact directory; (iii) select a contact in the contact directory; and (iv) select a mode of communicating with the contact (e.g., mobile voice call). Other applications may have fewer or more steps required. In another example, a touch dial mode may require a certain number of steps that are required to present a touch pad and a number of key entries for a domestic or foreign call. The number in the sequence required to complete the request for the voice call may be detected by recognizing an international calling prefix. Some voice modes may be analogous to touch modes but have a slightly different number of steps before or after the numeric entry such as a spoken attention step to activate the spoken user interface that is not required for the corresponding touch mode. Similarly, a gesture-based mode may require multiple movement directions to correspond to one numeric entry, increasing the number of user inputs required in the sequence.

Figure 3A:
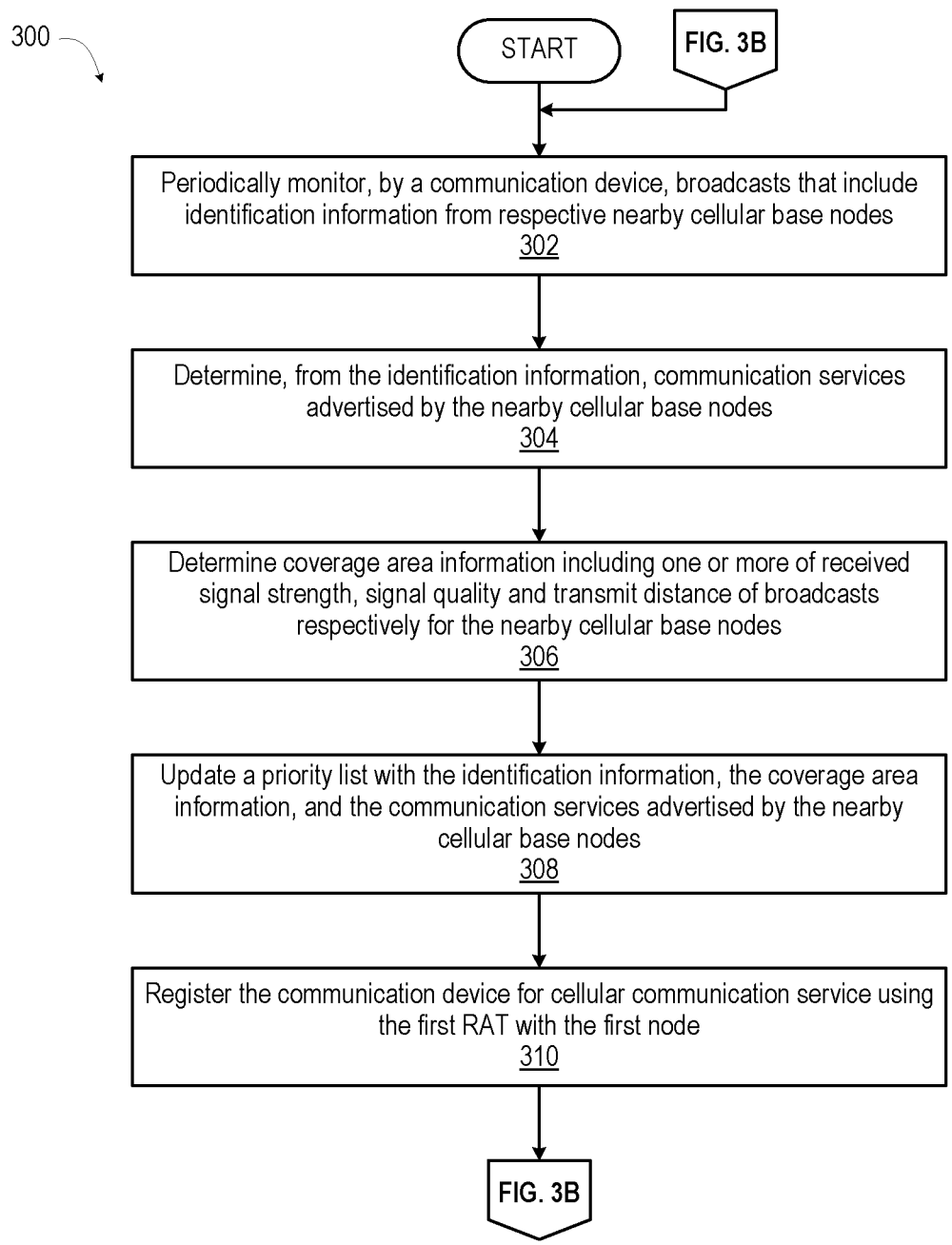
FIGS. 3A-3B (collectively FIG. 3) present a flow diagram of a method performed by the communication device for updating historical data of connection successes and failures for completing a selected service connection at a first node using a first RAT, according to one or more embodiments.
Figure 3B:
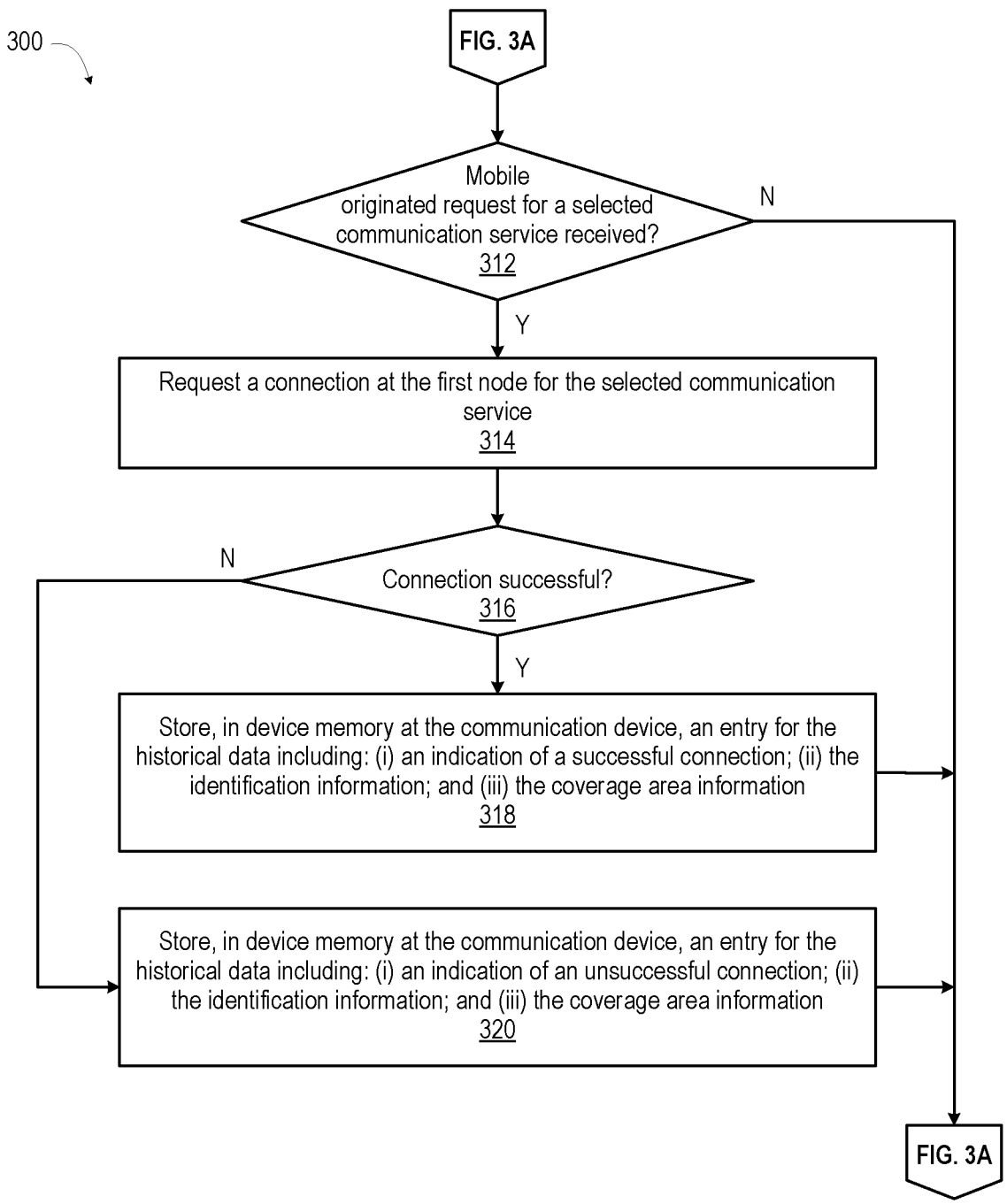
Figure 4A:
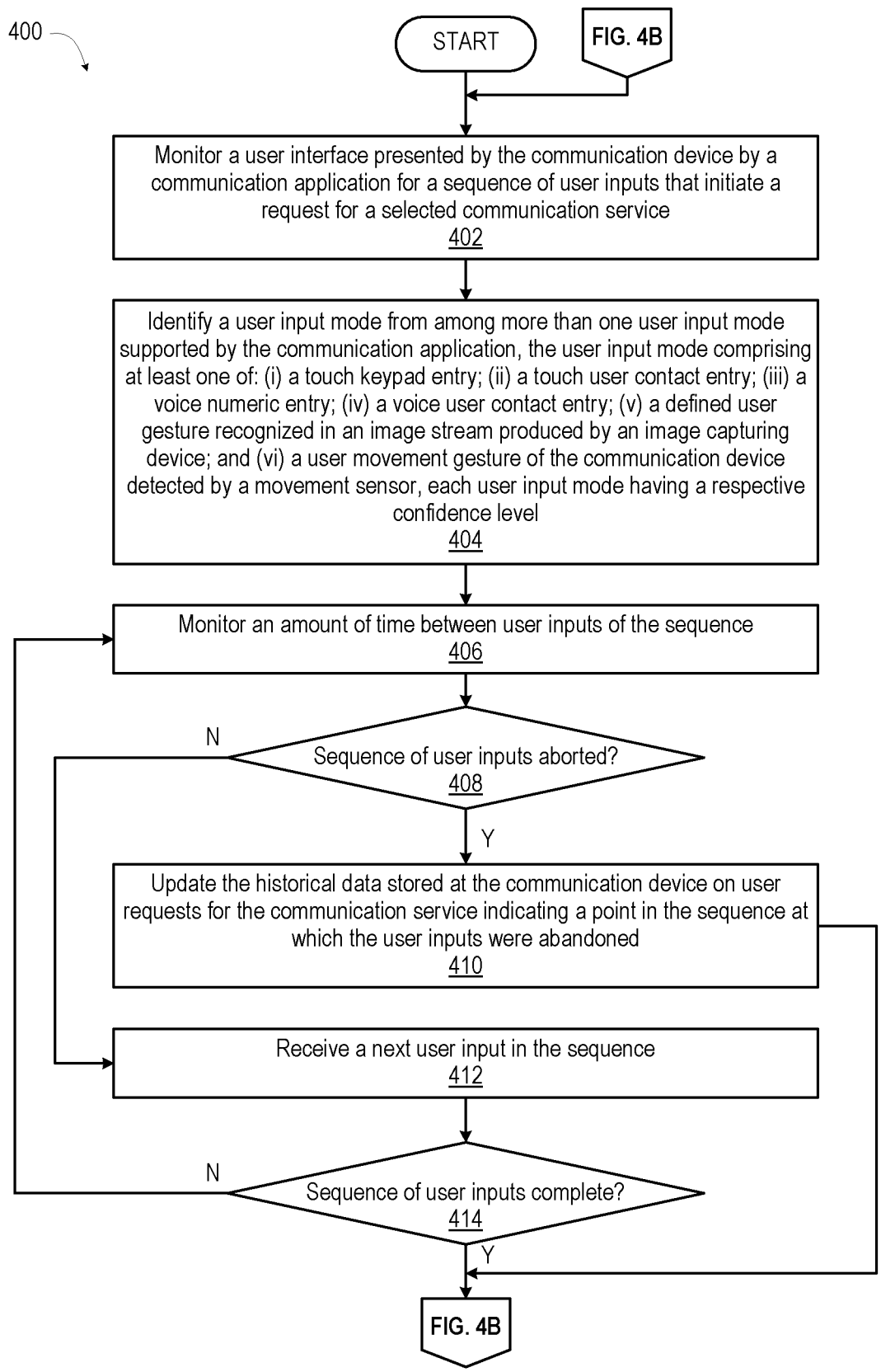
FIGS. 4A-4B (collectively FIG. 4) present a flow diagram of a method performed by the communication device for updating the historical data tracking user inputs in a sequence for future request predictions, according to one or more embodiments.
Figure 4B:
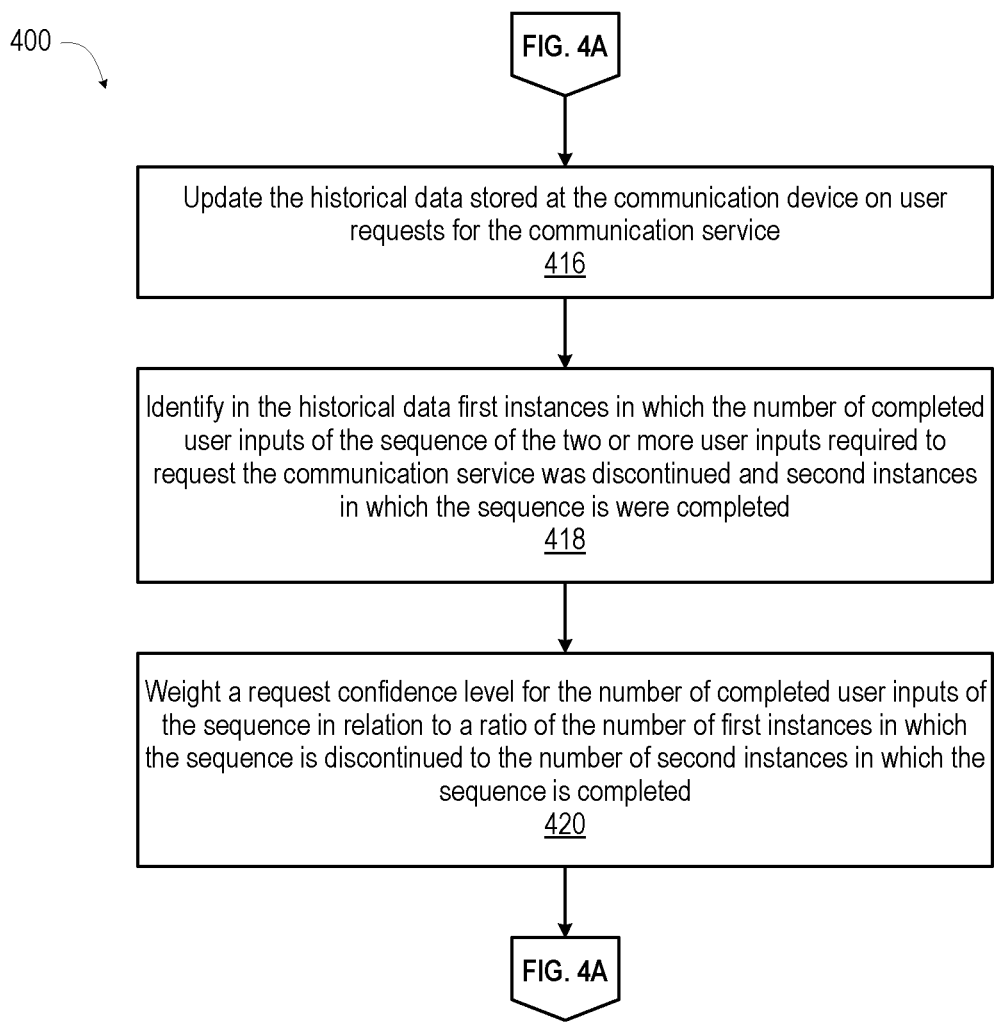
Figure 5A:
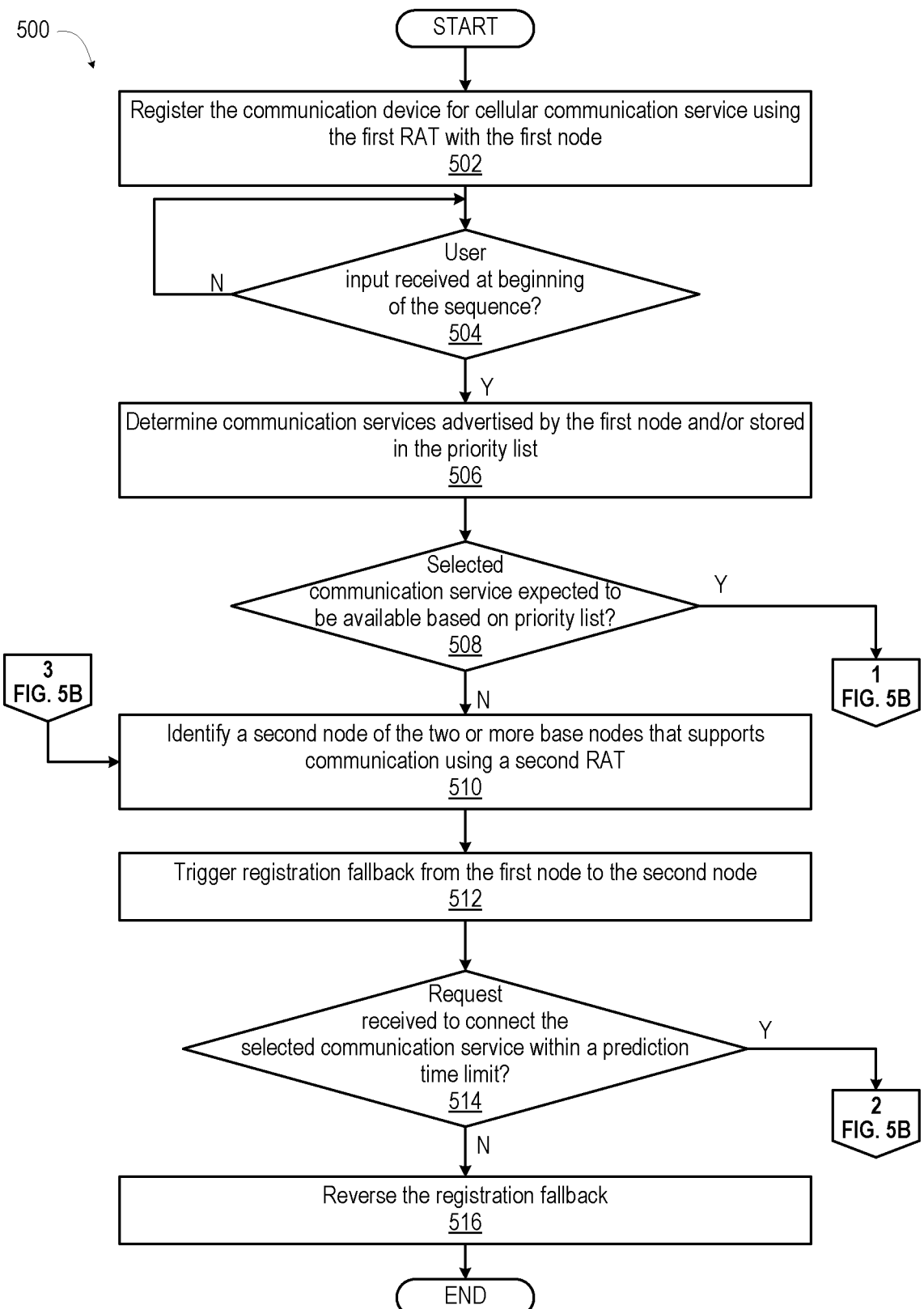
FIGS. 5A-5B (collectively FIG. 5) present a flow diagram of a method performed by the communication device that uses the historical data to initiate registration fallback to a second node using a second RAT to reduce setup time, according to one or more embodiments.
Figure 5B:
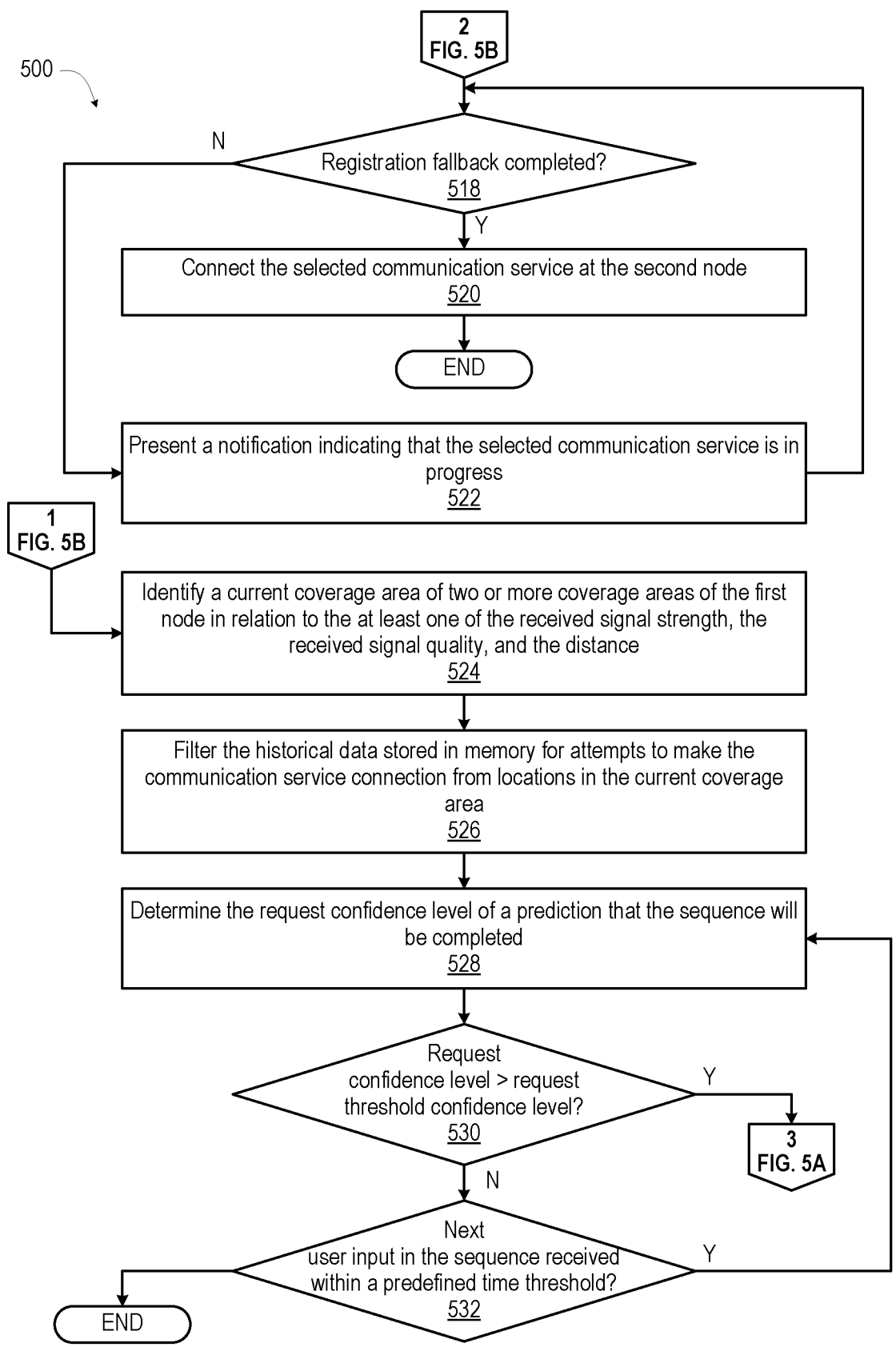

FIGS. 3A-3B (collectively FIG. 3) present a flow diagram of method 300 performed by a communication device for updating historical data for future connection predictions. The historical data includes connection successes and failures of completing a selected service connection at a first node using a first RAT along with associated identification information and coverage information. FIGS. 4A-4B (collectively FIG. 4) present a flow diagram of method 400 performed by the communication device for updating the historical data for future request predictions for the selected communication service. The historical data includes entries for instances in which user inputs were partially or completely performed in a sequence required to request the selected communication service. FIGS. 5A-5B (collectively FIG. 5) present a flow diagram of method 500 performed by the communication device that uses the historical data to initiate registration fallback to a second node using a second RAT to reduce setup time. In particular, the communication device responds to determining both a predicted request for a selected communication service and a predicted failure to connect the requested communication service at the first node. The descriptions of methods 300, 400, and 500 are provided with general reference to the specific components illustrated within the preceding FIGS. 1-2, and specific components referenced in methods 300, 400, and 500 may be identical or similar to components of the same name used in describing preceding FIGS. 1-2. In one or more embodiments, controller 101 configures communication device 100 (FIG. 1) to provide functionality of methods 300, 400, and 500.

With reference to FIG. 3A, method 300 includes periodically monitoring, by a communication device, broadcasts that include identification information from respective nearby cellular base nodes (block 302). Method 300 includes determining, from the identification information, communication services advertised by the nearby cellular base nodes (block 304). Method 300 includes determining coverage area information including one or more of received signal strength, signal quality, and transmit distance of broadcasts, respectively, for the nearby cellular base nodes (block 306). Method 300 includes updating a priority list with the identification information, the coverage area information, and the communication services advertised by the nearby cellular base nodes (block 308). Method 300 includes registering the communication device for cellular communication service using the first RAT with a first node (block 310). Method 300 proceeds to decision block 312 (FIG. 3B).

With reference to FIG. 3B, method 300 includes determining whether a mobile originated request for a selected communication service is received (decision block 312). In one or more embodiments, a controller of the communication service identifies a type of the selected communication service from among one or more of: (i) a voice call; (ii) a video service; (iii) a virtual reality (VR) service; (iv) extended reality (XR) service; (v) augmented reality (AR) service; (vi) an internet protocol multimedia subsystem (IMS) service; and (vii) a strict quality of service (QoS) cellular service. In response to not receiving a mobile originated request for the selected communication service, method 300 returns to block 302 (FIG. 3A) to continue updating the records. In response to determining that a mobile originated request for the selected communication service is received, method 300 includes requesting a connection at the first node for the selected communication service (block 314). Method 300 includes determining whether the connection was successful (decision block 316). In response to determining that the connection was successful, method 300 includes storing, in device memory at the communication device, an entry of historical data including: (i) an indication of a successful connection; (ii) the identification information; and (iii) the coverage area information (block 318). Then, method 300 returns to block 302. In response to determining that the connection was not successful, method 300 includes storing, in device memory at the communication device, a different entry of historical data including: (i) an indication of an unsuccessful connection; (ii) the identification information; and (iii) the coverage area information (block 320). Then method 300 returns to block 302.

With reference to FIG. 4A, method 400 includes monitoring a user interface presented by a communication application of the communication device for an initial entry of a sequence of user inputs that initiate a request for a selected communication service (block 402). Method 400 includes identifying a user input mode from among more than one user input modes supported by the communication application, the user input mode comprising at least one of: (i) a touch keypad entry; (ii) a touch user contact entry; (iii) a voice numeric entry; (iv) a voice user contact entry; (v) a defined user gesture recognized in an image stream produced by an image capturing device; and (vi) a user movement gesture of the communication device detected by a movement sensor (block 404). In one or more embodiments, each user input mode has a respective confidence level. Each mode of user input may have a different number of user inputs in the sequence that require assigning a different confidence level to each entry in the sequence. Each mode of user input may have a differing propensity to be misinterpreted by the communication device. In an example, a touch screen device could be placed in a pocket and the touch screen sensor could misinterpret inadvertent contact as a control selection. In another example, a voice activated control may misinterpret the user speaking to another person as an activation trigger. In an additional example, hands-free spoken mode used while driving may be less likely to be completed than a touch dialing mode used while not driving. Method 400 includes monitoring an amount of time between individual user inputs of the sequence (block 406). Method 400 includes determining whether the sequence of user inputs is aborted without progressing through the sequence (decision block 408). In response to determining that the sequence of user inputs is aborted, method 400 includes updating the historical data stored at the communication device indicating a point in the sequence at which the entry of user inputs was abandoned (block 410). In an example, a user may be more likely to abandon the sequence after entering the first entry than after entering the next to last entry. The first entry is more likely to have been inadvertent as compared to correctly entering a longer portion of the sequence. The likelihood of an intervening distraction occurring to cause the abandonment of the input sequence is less when closer to the last entry than when more user inputs remain. Capturing the abandonment of the inputs at different steps in the sequence for a particular mode of user input captures the granularity of the respective contexts to make a more accurate prediction. Method 400 proceeds to decision block 414. In response to determining that the sequence of user inputs is not aborted, method 400 includes receiving a next user input in the sequence (block 412). Method 400 includes determining whether the sequence of user inputs is complete, indicating a completed request for the selected communication service (decision block 414). In response to determining that the sequence of user inputs is not complete, method 400 returns to block 406. In response to determining that the sequence of user inputs is complete, method 400 proceeds to block 416 (FIG. 4B).

With reference to FIG. 4B, method 400 includes updating the historical data on user requests for the communication service (block 416). Method 400 includes identifying, in the historical data, first instances in which the number of completed user inputs of the sequence of the two or more user inputs required to request the communication service was discontinued and second instances in which the sequence was completed (block 418). Method 400 includes applying a weighting representing a request confidence level for the number of completed user inputs of the sequence in relation to a ratio of the number of first instances in which the sequence is discontinued to the number of second instances in which the sequence is completed (block 420). Method 400 returns to block 402.

In conventional applications, when a prediction that the user will request the selected communication service is wrong, the reason for switching RATs is removed. The reason that originally caused the device to first register with the first node probably still exists. The communication device then initiates a reversal in the registration fallback to return the registration to the first node. Repeated reversals of registration fallback may create an overhead processing burden for a radio access network (RAN) and other network entities that provide the cellular communication services. In one or more embodiments, the present disclosure reduces the burden to the network by identifying whether a user frequently aborts entering the request sequence for a selected communication service. According to one aspect of the disclosure, the weighting of the request confidence level may be conservatively shifted to reduce the likelihood of a reversal. For example, when the next-to-last user input in the sequence is received (e.g., 11 of 12), the communication device may have a high confidence (e.g., 90%) that the request is predicted to be completed shortly with the final user input. By contrast, the reduction in confidence may be nonlinear when more user inputs remain. The confidence level at 10 of 12 user inputs may be weighted to be 70% even though the historical data suggests an 80% confidence level. Similar, the confidence level at 9 of 12 user inputs may be weighted to be 50% even if the historical data suggests a 70% confidence level. The downward weighting reduces the likelihood of reversals of registration fallback. In addition, the mode of receiving user inputs that result in the request for the selected communication service may be weighted in relation to how easily such modes are inadvertently triggered. In an example, touch screen controls may be inadvertently activated when placed in a pocket. By contrast, a voice command request for a voice call may be less likely to be canceled or to be inadvertent. The confidence values may reflect historically how often each mode of user input is canceled.

With reference to FIG. 5A, method 500 includes registering the communication device for cellular communication service using the first RAT with the first node (block 502). Method 500 includes determining whether a user input is received at a beginning of the sequence of user inputs required to request a selected communication service (decision block 504). In response to determining that a user input that begins a sequence required to request the selected communication service is not received, method 500 returns to block 502. In response to determining that a user input that begins the sequence required to request the selected communication service is received, method 500 includes determining communication services advertised by the first node and/or stored in the priority list (block 506). Method 500 includes determining whether the selected communication service is predicted to be available from the first node based on the communication services advertised by the first node and/or stored in the priority list (decision block 508). In response to determining, based on the communication services advertised by the first node and stored in the priority list, that the selected communication service is predicted to be available from the first node, method 500 proceeds to block 524 (FIG. 5B).

In response to determining that the selected communication service is predicted to not be available from the first node based on the communication services advertised by the first node and/or stored in the priority list, method 500 includes identifying a second node of the two or more base nodes that supports communication using a second RAT (block 510). In one or more embodiments, the second node advertises support for the selected communication service and communication device stores this information in the priority list. In one or more embodiments, a similar prediction based on historical data by the controller indicates that the second node is predicted to be able to provide the selected communication service. Method 500 includes triggering registration fallback from the first node to the second node (block 512). Those skilled in the art are aware of the various communication standards, protocols and procedures that govern falling back registration from a first base node using one RAT to a second base node using another RAT. In one or more embodiments, the registration fallback may be between a newer generation RAT (e.g., 5G or 6G) and an older generation RAT (e.g., 3G or 4G). In one or more embodiments, the registration fallback may be between an older generation RAT (e.g., 3G or 4G) and a newer generation RAT (e.g., 5G or 6G). In one or more embodiments, registration fallback may be between competing RATs that are considered to be in the same generation but that have at least partially incompatible communication protocols. In an example, the registration fallback is between two sub-RATs that respectively utilize different frequency bands or "spectrum slices", such as sub-6 GHz and mmWave within 5G RAT. Method 500 includes determining whether a request is received (i.e., sequence completed) to connect the selected communication service from a communication application executed by the communication device within a prediction time limit (decision block 514). In response to determining that a request is not received within the prediction time limit, method 500 includes reversing the registration fallback (block 516). Then method ends. In response to determining that a request is received within the prediction time limit, method 500 proceeds to decision block 518 (FIG. 5B).

With reference to FIG. 5B, method 500 includes determining whether the registration fallback from the first node to the second node has been completed (decision block 518). In response to determining that the registration fallback has been completed, method 500 includes connecting the selected communication service via the second node (block 520). Then method 500 ends. In response to determining that the registration fallback has not been completed, method 500 includes presenting one or more notifications indicating that the selected communication service (e.g., voice call) is in progress (block 522). In one or more embodiments, the notification can be one or more of a ring back tone at an audio output device, a visual indication at a display device, and/or a tactile indication at haptic/vibration output device of the communication device. In one or more embodiments, the notification is presented in response to determining that that the amount of time exceeds a threshold time corresponding to registration fallback taking longer than an expected amount of time and that that registration fallback has not been completed. Then method 500 returns to decision block 518.

In response to determining that the selected communication service is predicted to be available from the first node based on the communication services advertised by the first node in decision block 508 (FIG. 5A), method 500 includes identifying a current coverage area of two or more coverage areas of the first node in relation to the at least one of the received signal strength, the received signal quality, and the distance (block 524). The two or more coverage areas include a marginal coverage area and a nominal coverage area that has a higher probability of a successful connection for cellular communication service than the marginal coverage area. Method 500 includes filtering the historical data stored in memory for attempts to make the communication service connection from locations in the current coverage area (block 526). Method 500 includes determining the request confidence level of a prediction that the sequence will be completed (block 528). Completion of the sequence results in a mobile-originated request for the selected communication service. The prediction is based on the historical data for a currently completed portion of the sequence. Method 500 includes determining whether the request confidence level is greater than a request threshold confidence level (decision block 530). In response to determining that the first confidence level is greater than the request threshold confidence level, method 500 returns to block 510 (FIG. 5A). In response to determining that the first confidence level is not greater than (i.e., less than or equal to) the request threshold confidence level, method 500 includes determining whether a next user input in the sequence of user inputs is received within a predefined time threshold (decision block 532). In response to determining that the next user input sequence of user inputs is received within the predefined time threshold, method 500 returns to block 524. In response to determining that the next user input sequence of user inputs is not received within the predefined time threshold, method ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
   a communication subsystem communicatively connectable to two or more base nodes using either of a first radio access technology (RAT) and a second RAT;
   a memory that stores a communication application; and
   a controller communicatively coupled to the communication subsystem and the memory and which:
   registers the communication device for cellular communication service using the first RAT with a first node of the two or more base nodes;
   determines whether a connection for a selected communication service is predicted to be available from the first node, wherein, the controller:
   accesses, from memory, stored historical data related to attempts to make a connection with the first node for the selected communication service;
   compares, to a threshold ratio, a historical ratio of a first number of unsuccessful attempts to a second number of total attempts within a recent period of time; and
   determines that the connection for the selected communication service is predicted to not be available from the first node in response to the historical ratio exceeding the threshold ratio;
   determines whether a mobile originated request for the selected communication service is predicted to occur; and in response to determining that (i) the connection for the selected communication service is predicted to not be available from the first node and (ii) the mobile originated request for the selected communication service is predicted to occur:
- identifies a second node of the two or more base nodes that supports communication using the second RAT;
- triggers registration fallback from the first node to the second node; and
- in response to receiving a subsequent request from the communication application to connect the selected communication service, connects the selected communication service via the second node.

2. The communication device of claim 1, wherein, to determine whether the connection for the selected communication service is predicted to be available from the first node, the controller:
- identifies that the selected communication service comprises one or more of: (i) a voice call; (ii) a video service; (iii) a virtual reality (VR) service; (iv) extended reality (XR) service; (v) augmented reality (AR) service; (vi) an internet protocol multimedia subsystem (IMS) service; and (vii) a strict quality of service (QOS) cellular service; and
- receives identification information broadcast by the first node that indicates that cellular communication services currently supported by the first node does not include the selected communication service.

3. The communication device of claim 1, wherein the controller:
- determines whether the mobile originated request for the selected communication service is predicted to occur by determining that a request confidence level of a first prediction is greater than a request threshold confidence level; and
- triggers registration fallback from the first node to the second node in response to determining that (i) the connection for the selected communication service is predicted to not be available from the first node and (ii) the mobile originated request for the selected communication service is predicted to occur, with the request confidence level being greater than the request threshold confidence level.

4. The communication device of claim 1, wherein, in determining whether the connection for the selected communication service is predicted to be available from the first node, the controller:
- identifies at least one of (i) received signal strength of a signal from the first node; (ii) received signal quality of the signal from the first node; and (iii) distance between the communication device and the first node;
- identifies a current coverage area of two or more coverage areas of the first node in relation to the at least one of the received signal strength, the received signal quality, and the distance, the two or more coverage areas including a marginal coverage area and a nominal coverage area that has a higher probability of a successful connection for cellular communication service than the marginal coverage area; and
- filters the historical data stored in memory for attempts to make the selected communication service connection from locations in the current coverage area.

5. The communication device of claim 1, wherein the controller:
- in response to identifying that one of a service failure and a network-initiated registration fallback has occurred, generates a new entry indicating an unsuccessful attempt for connection with the first node for the selected communication service;
- in response to identifying that the attempt to make a connection with the first node for the selected communication service is successful and that a subsequent communication service with a second communication device concludes normally, generates the new entry indicating a successful attempt for a connection with the first node for the selected communication service; and
- stores the new entry in the historical data with associated contextual data comprising at least one of: (i) received signal strength of a signal from the first node; (ii) received signal quality of the signal from the first node; (iii) distance between the communication device and the first node; and (iv) geospatial location of the communication device.

6. The communication device of claim 1, wherein, in determining whether the mobile originated request for the selected communication service is predicted to occur, the controller:
- identifies user inputs in a sequence of two or more user inputs to the communication application, the sequence required to trigger the mobile-originated request for the selected communication service;
- determines a request confidence level of a prediction that the mobile originated request for the selected communication service will occur based on a number of completed user inputs in the sequence of two or more user inputs to the communication application; and
- determines that the mobile originated request for the selected communication service is predicted to occur when the request confidence level is greater than a request threshold confidence level.

7. The communication device of claim 6, wherein the controller:
- identifies first instances in which the number of completed user inputs of the sequence of the two or more user inputs required to request the selected communication service was discontinued and second instances in which the sequence is were completed; and
- weights the request confidence level for the number of completed user inputs of the sequence in relation to a ratio of the number of first instances in which the sequence is discontinued to the number of second instances in which the sequence is completed.

8. The communication device of claim 6, wherein, in determining whether the mobile originated request for the selected communication service is predicted to occur above a request threshold confidence level, the controller:
- identifies a user input mode from among more than one user input mode supported by the communication application, the user input mode comprising at least one of: (i) a touch keypad entry; (ii) a touch user contact entry; (iii) a voice numeric entry; (iv) a voice user contact entry; (v) a defined user gesture recognized in an image stream produced by an image capturing device; and (vi) a user movement gesture of the communication device detected by a movement sensor, each user input mode having a respective request confidence level; and
- determines the respective request confidence level that is related to the user input mode.

9. The communication device of claim 1, further comprising an output device communicatively coupled to the controller and which produces at least one of a light output, an audio output, and a vibration output, and the controller:
- determines an amount of time that has elapsed since completion of a sequence of user inputs to the communication application required to request the connection for the selected communication service;
- determines whether the registration fallback from the first node to the second node has been completed; and
- in response to determining that registration fallback has not been completed and that the amount of time exceeds a threshold time corresponding to registration fallback taking longer than an expected amount of time, presents a notification at the output device indicating that connection for the selected communication service is in progress.

10. A method comprising:
- registering a communication device for cellular communication service using a first radio access technology (RAT) with a first node of two or more base nodes;
- determining whether a connection for a selected communication service is predicted to be available from the first node;
- determining whether a mobile originated request for the selected communication service is predicted to occur, by:
  - accessing, from memory, stored historical data related to attempts to make a communication service connection with the first node;
  - comparing, to a threshold ratio, a historical ratio of a first number of unsuccessful attempts to a second number of total attempts within a recent period of time; and
  - determining that the connection for the selected communication service is unavailable from the first node in response to the historical ratio exceeding the threshold ratio; and
- in response to determining that (i) the connection for the selected communication service is predicted to not be available from the first node and (ii) the mobile originated request for the selected communication service is predicted to occur:
  - identifying a second node of the two or more base nodes that supports communication using a second RAT;
  - triggering registration fallback from the first node to the second node; and
  - in response to receiving a subsequent request to connect a selected communication service from a communication application executed by the communication device, connecting the selected communication service at the second node.

11. The method of claim 10, wherein determining whether the connection for the selected communication service is predicted to be available from the first node further comprises:
- identifying that the selected communication service comprises one or more of: (i) a voice call; (ii) a video service; (iii) a virtual reality (VR) service; (iv) extended reality (XR) service; (v) augmented reality (AR) service; (vi) an internet protocol multimedia subsystem (IMS) service; and (vii) a strict quality of service (QOS) cellular service; and
- receiving identification information broadcast by the first node that indicates that cellular communication services currently supported by the first node does not include the selected communication service.

12. The method of claim 10, further comprising:
- determining whether the mobile originated request for the selected communication service is predicted to occur by determining that a request confidence level of a prediction is greater than a request threshold confidence level; and
- triggering registration fallback from the first node to the second node in response to determining that (i) the connection for the selected communication service is predicted to not be available from the first node and (ii) the mobile originated request for the communication service is predicted to occur, with the request confidence level being greater than the request threshold confidence level.

13. The method of claim 10, wherein determining whether the connection for the selected communication service is predicted to be available from the first node further comprises:
- identifying at least one of (i) received signal strength of a signal from the first node; (ii) received signal quality of the signal from the first node; and (ii) distance between the communication device and the first node;
- identifying a current coverage area of two or more coverage areas of the first node in relation to the at least one of the received signal strength, the received signal quality, and the distance, the two or more coverage areas including a marginal coverage area and a nominal coverage area that has a higher probability of a successful connection for cellular communication service than the marginal coverage area; and
- filtering the historical data stored in memory for attempts to make the communication service connection from locations in the current coverage area.

14. The method of claim 10, further comprising:
- in response to identifying that one of a service failure and a network-initiated registration fallback has occurred, generating a new entry indicating an unsuccessful attempt for a communication service connection with the first node;
- in response to identifying that the attempt to make a communication service connection with the first node is successful and that a subsequent communication service with a second communication device concludes normally, generating the new entry indicating a successful attempt for a communication service connection with the first node; and
- storing the new entry in the historical data with associated contextual data comprising at least one of: (i) received signal strength of a signal from the first node; (ii) received signal quality of the signal from the first node; (iii) distance between the communication device and the first node; and (iv) geospatial location of the communication device.

15. The method of claim 10, wherein determining whether the mobile originated request for the selected communication service is predicted to occur further comprises:
- identifying user inputs in a sequence of two or more user inputs to the communication application, the sequence required to trigger the connection request for the selected communication service;
- determining a request confidence level of a prediction that the mobile originated request for the selected communication service will occur based on a number of completed user inputs in the sequence of two or more user inputs to the communication application; and determining that the mobile originated request for the selected communication service is predicted to occur when the request confidence level is greater than a request threshold confidence level.

16. The method of claim 15, further comprising:
identifying first instances in which the number of completed user inputs of the sequence of the two or more user inputs required to request the selected communication service was discontinued and second instances in which the sequence is were completed; and
weighting the request confidence level for the number of completed user inputs of the sequence in relation to a ratio of the number of first instances in which the sequence is discontinued to the number of second instances in which the sequence is completed.

17. The method of claim 15, wherein determining whether the mobile originated request for the selected communication service is predicted to occur above a request threshold confidence level further comprises:
identifying a user input mode from among more than one user input mode supported by the communication application, the user input mode comprising at least one of: (i) a touch keypad entry; (ii) a touch user contact entry; (iii) a voice numeric entry; (iv) a voice user contact entry; (v) a defined user gesture recognized in an image stream produced by an image capturing device; and (vi) a user movement gesture of the communication device detected by a movement sensor, each user input mode having a respective request confidence level;
determining the respective request confidence level that is related to the user input mode;
determining an amount of time that has elapsed since completion of a sequence of user inputs to the communication application required to request the connection for the selected communication service;
determining whether the registration fallback from the first node to the second node has been completed; and
in response to determining that that the amount of time exceeds a threshold time corresponding to registration fallback taking longer than an expected amount of time and that that registration fallback has not been completed, presenting a notification comprising at least one of a light output, an audio output, and a vibration output at an output device of the communication device indicating that the connection is in progress.

18. A computer program product comprising:
a computer readable storage device; and
program code on the computer readable storage device that when executed by a processor associated with a communication device, the program code enables the communication device to provide functionality of:
registering a communication device for cellular communication service using a first radio access technology (RAT) with a first node of two or more base nodes;
determining, from historical data related to attempts to make a connection with the first node for the selected communication service, whether a connection for a selected communication service is predicted to be available from the first node;
determining whether a mobile originated request for the selected communication service is predicted to occur by:
accessing, from memory, stored historical data related to attempts to make a communication service connection with the first node;
comparing, to a threshold ratio, a historical ratio of a first number of unsuccessful attempts to a second number of total attempts within a recent period of time; and
determining that the connection for the selected communication service is unavailable from the first node in response to the historical ratio exceeding the threshold ratio; and
in response to determining that (i) the connection for the selected communication service is predicted to not be available from the first node and (ii) the mobile originated request for the selected communication service is predicted to occur:
identifying a second node of the two or more base nodes that supports communication using a second RAT;
triggering registration fallback from the first node to the second node; and
in response to subsequently receiving a request to connect the selected communication service from a communication application, connecting the selected communication service at the second node.

* * * * *